United States Patent [19]

Seidl

[11] Patent Number: 4,807,487
[45] Date of Patent: Feb. 28, 1989

[54] MASS-COMPENSATION OSCILLATING DRIVE FOR OSCILLATORY MACHINES

[75] Inventor: Johnann Seidl, Hanftal, Austria

[73] Assignee: Maschinenfabrik Heid Aktiengesellschaft, Stockerau, Austria

[21] Appl. No.: 50,539

[22] Filed: May 14, 1987

[30] Foreign Application Priority Data

May 15, 1986 [AT] Austria ................................. 1303/86

[51] Int. Cl.$^4$ .................................................. B07B 1/42
[52] U.S. Cl. ......................................... 74/26; 198/766; 209/365.1
[58] Field of Search .............. 74/26; 209/365.1, 365.4, 209/366, 366.5, 367; 198/766

[56] References Cited

U.S. PATENT DOCUMENTS

| 1,577,310 | 3/1926 | Sutton et al. ............................ 74/26 |
| 2,258,217 | 10/1941 | Robins ................................. 209/366.5 |
| 3,250,380 | 5/1966 | Allen et al. ............................ 198/766 |

FOREIGN PATENT DOCUMENTS

| 71603 | 1/1943 | Czechoslovakia .................. 209/366 |
| 630002 | 5/1936 | Fed. Rep. of Germany .......... 74/26 |
| 838609 | 3/1939 | France ................................. 198/766 |
| 530535 | 10/1953 | Italy .................................... 74/26 |
| 43923 | 9/1938 | Netherlands ..................... 209/365.1 |
| 80436 | 5/1934 | Sweden ................................. 74/26 |
| 31352 | 5/1904 | Switzerland ............................. 74/26 |
| 79548 | 3/1918 | Switzerland ............................. 74/26 |

*Primary Examiner*—Lawrence Staab
*Assistant Examiner*—Scott Anchell
*Attorney, Agent, or Firm*—Herbert Dubno

[57] ABSTRACT

Mass balance for a screen oscillating drive is provided mounting the eccentric or crankshaft assembly on extensions of the links supporting the working frame. The axis of the suspended mass $m_2$ is spaced by a distance $a_2$ from the pivot of the links to the base frame such that the product $m_2.a_2$, is substantially equal to the product $m_1.a_1$ where $a_1$ is the distance between the pivot of the link to the base frame and the pivot of the links to the working frame and $m_1$ is the mass of the working frame. The axis of the suspended mass $m_2$ intersects the centerline of the links in the median position thereof at a normal to this centerline connecting the latter axis and the center of mass of the working frame as seen in side view.

5 Claims, 1 Drawing Sheet

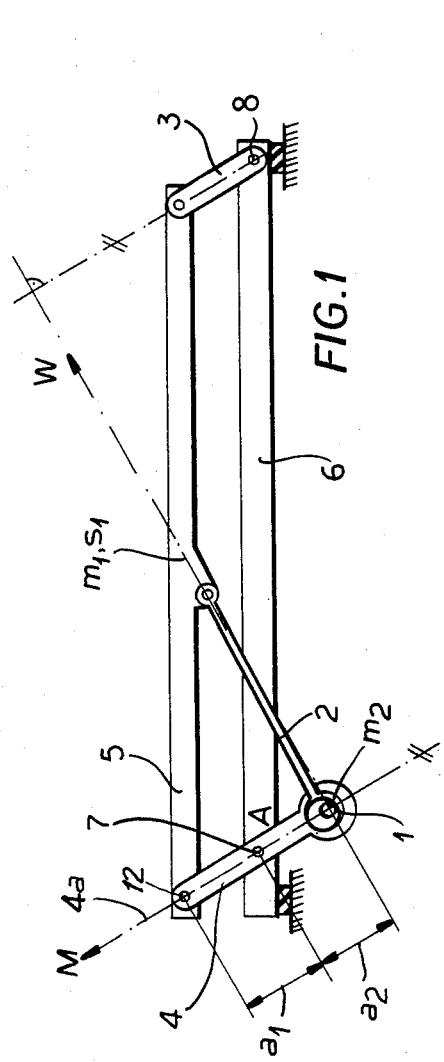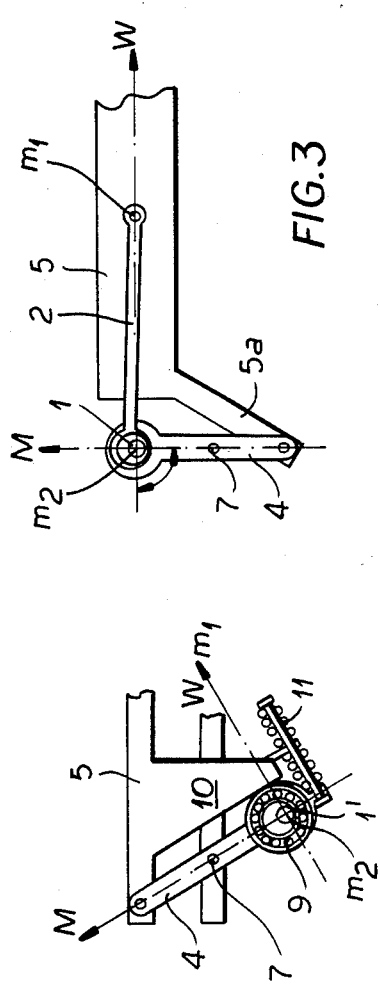

MASS-COMPENSATION OSCILLATING DRIVE FOR OSCILLATORY MACHINES

FIELD OF THE INVENTION

My present invention relates to a mass-balancing oscillation drive system for oscillatory machines, such as a weight-sifting, dry-stone sieve, flat-sieve or like screening machine of the type in which a screen is spanned across a frame, hereinafter referred to as a working frame, which is mounted by appropriate links pivotally on a support frame or base so that a motor-driven eccentric drive or crank shaft, both being referred to generically as eccentrics, imparts oscillatory movement to the screen to effect the separating, screening or classifying action.

BACKGROUND OF THE INVENTION

Screening and sieving machines of the aforedescribed type are widely used for separating particulates by size, the smaller particle size passing through the screen while the larger particles are discharged from the surface of the screen.

The oscillatory movement is usually imparted to the working screen by a connecting rod coupling the crankshaft with the working frame or by forming the working frame with a surface which rides on an eccentric surface of the eccentric drive so that the "throw" or eccentricity of the movement generated by the motor is applied to the working frame.

In general, the motor is mounted at a fixed location or on a structure which is fixed with respect to the working frame and thus the reaction forces which are generated when throw is imparted to the working frame may be taken up by the base frame or foundation structure on which the motor is mounted or which carries the journals of the eccentric drive assembly. The stress thus applied to the foundation is multiplied by the fact that the masses which are displaced by the drive are accelerated and thus momentum forces contribute to the loading of the support structure.

The energy which may be absorbed by the motor support structure is thus a function of the product of the mass which must be displaced and its acceleration.

It is difficult, if not impossible, with conventional oscillating machine designs to minimize the application of such stress to the environment of the machine, i.e. the base frame and foundation, while increasing the efficiency of the transmission of energy to the working frame.

The problem is that even more significant for mobile screening machines or screening machines which require some kind of adjustment of the position of the machine parts during operation such repositioning may be required for adjustment purposes and, namely, cannot be done without bringing the machine to a standstill.

With mobile machines which do not have the most stable purchase of the ground, the problem of dealing with the reaction forces is even more pronounced.

OBJECTS OF THE INVENTION

It is the principal object of the present invention to provide an improved oscillatory machine and especially an improved oscillating drive system for such a machine whereby the difficulties encountered heretofore with reaction forces can be obviated.

Another object of this invention is to provide a machine having an oscillating drive which permits mass balancing so that reaction forces are compensated and stress upon the machine base or a foundation therefor can be minimized.

Still another object of this invention is to provide a drive system for an oscillatory or vibratory screening machine which will eliminate the drawbacks enumerated above.

SUMMARY OF THE INVENTION

These objects and others which will become more apparent hereinafter are attained, in accordance with this invention by providing the link or links at one end of the oscillatory frame so that it or they are extended beyond their respective pivots in the base frame and by journalling the eccentric assembly on the extension or extensions of the link or links so that in side view, the axis of this assembly lies substantially at the intersection between a centerline through the pivots of the link which represent the median position of the link in its oscillatory movement, and a line orthogonal to the centerline through the center of gravity of the working frame as seen in a side view of the apparatus.

Furthermore, the product of the mass of the working frame and the distance between its pivot to the link and the pivot of the link on the base is substantially equal to the product of the suspended mass of the oscillating assembly and the distance between the axis of rotation of the latter on the link and its pivot to the base.

The suspended member of the oscillating assembly can include the mass of the motor provided that the motor coincides with the eccentric drive shaft and, of course, any other mechanism for driving the eccentric drive shaft. When, of course, the motor is connected to the eccentric drive shaft by belts or the like, the suspended mass can be considered to be only that of the driven elements connected by the belts to the motor.

One of the advantages of the system of the invention is without substantial modification of existing machines, it is possible to equip them with a mass-balancing system of the type described and thereby increase their efficiency with minimum spatial requirements and without great cost. Indeed, existing machines can be retrofitted in accordance with the invention on site.

Mass balance is achieved in accordance with the invention when two masses of approximately the same magnitude are moved in opposite directions with the same speed so that the respective centers of gravity move along a common line and such that the total center of gravity of the system remains at rest. It is also achieved when the moments of the two masses act in opposite directions effectively along the same line.

The system of the invention, therefore, transforms the conventional oscillatory drive into a two-mass system in that the position of the crank or eccentric shaft, instead of being journaled in the base frame, is mounted on the end of an extension of link beyond its pivot in the base frame and the entire drive arrangement is thus shifted so that the link or coupling line to the center of gravity of the working frame and through the eccentric shaft axis lies perpendicular to the link plane.

According to a feature of the invention, a belt drive is used and the axis of the motor shaft intersects the centerline in the median position of the link. With this arrangement of the belt drive, the axial spacing of the motor axis from the crankshaft or eccentric axis remains approximately constant even without oscillation of the link.

To allow selective positioning of the drive motor, the crank or eccentric shaft can be provided with a sheave having an eccentric hub such that the eccentricity of the sheave is equal to one-half of the throw or swing amplitude of the crank or eccentric shaft by the sine of the angle between the centerline in its median position of the link and the connecting line between the motor-shaft axis and the crank- or eccentric-shaft axis.

Naturally, where an extension of a link is described in accordance with the invention, in practice a pair of links will be so extended and the crankshaft or eccentric shaft will bridge the two extensions. Thus reference to a single link may also be considered reference to a plurality of links which are parallel to one another and coact in supporting the working frame.

According to the invention, therefore, an oscillating machine such as a sifter, sieve, particle-size classifier or the like can comprise:

a base;

a working frame of mass $m_1$ spaced from the base;

a plurality of links pivotally connected to the working frame and to the base for supporting the working frame for oscillating movement on the base; and an oscillating drive coupled to the working frame, the oscillating drive including:

an extension formed on one of the links and extending from a pivot connecting the one of the links to the base in a direction away from another pivot connecting the one of the links to the working frame, the pivots being spaced apart by a distance $a_1$, a motor-driven eccentric drive assembly of a suspended mass $mp_2$ mounted on the extension and having an axis located at a distance $a_2$ from the other pivot such that the product $m_1 \cdot a_1$ is substantially equal to the product $m_2 \cdot a_2$, the axis being located substantially at an intersection between a centerline through the pivots in a median position of the one of the links upon oscillation thereof and a normal to the centerline through the center of mass of the working frame as seen in a side view of the frame and the base, and coupling means operatively engaged with the motor-driven eccentric drive assembly so as to be displaced with the throw thereof and operatively connected to the working frame so as to actuate the working frame with the throw.

The coupling means can include a connecting rod extending generally along the normal and pivotally connected to the working frame at the center of mass thereof as seen in the side view.

Alternatively, the coupling means includes a formation on the working frame bearing upon an eccentric of the assembly along a line of action corresponding generally to the normal.

In one aspect of the invention the assembly includes a motor and a crankshaft driven by the motor.

In another aspect, the assembly includes a motor and an eccentric shaft carrying an eccentric and driven by the motor.

In either case, the suspended mass of the assembly can include any mass of counterweights rotating with an eccentric member of the assembly.

In one specific embodiment, the assembly includes an eccentric member on the one of the links formed with an eccentric shaft having an axis parallel to axes of the pivots and defining the axis of the suspended mass, a motor having an axis parallel to the axis of the eccentric shaft and intersecting the centerline, and at least one belt coupling the motor and the eccentric shaft.

In this latter embodiment, the eccentric shaft is formed with a sheave engaged by the belt and having an eccentric hub such that the eccentricity of the sheave is half of the throw of the eccentric member times the sine of the angle included between the centerline and the line-connecting axis of the motor and the axis of the eccentric shaft.

BRIEF DESCRIPTION OF THE DRAWING

The above objects, features and advantages of my invention will become more readily apparent from the following description, reference being made to the accompanying drawing in which:

FIG. 1 is a side elevational view illustrating one embodiment of a assembly, according to the invention;

FIG. 2 a fragmentary side elevational view diagrammatically illustrating a second embodiment of such a drive; and FIG. 3 is a view similar to FIG. 2 of still a third embodiment.

SPECIFIC DESCRIPTION

The drawing illustrates oscillatory drives for a screening machine, it being understood that the working frame 5 in each case, is spanned by a screen surface (not shown) and is oscillated or vibrated by the drive means described to effect the screening operation.

The oscillating frame 5 can be swingably mounted by links 3 and 4 on a base frame 6 mounted on a foundation. The pivots between the links 3 and 4 and the base frame are shown at 7 and 8. While only two such links have been illustrated in FIG. 1, each working frame will usually be supported by two such links on each of its opposite sides and hence the structure illustrated in FIG. 1 may be seen to be duplicated on the opposite side of the frame, in mirror symmetrical relationship.

The links 4 at one end of the frame are extended beyond their pivots 7 downwardly and at the ends of these links 4 a crankshaft can be journaled. The crankshaft 1 is connected by connecting or coupling rods 2 pivotally with the working frame 5 substantially laterally in line with the center of gravity of the working frame which has a mass $m_1$ which is effective at this center of gravity.

The suspended assembly of the crankshaft and its motor, which is also carried on the extensions of the links 4, has a mass $m_2$ which is effective at the axis of the crank shaft.

In the illustration in FIG. 1, this suspended mass $m_2$ is embodied or represented by the mass of the crankshaft 1.

In any case, the center of gravity of the balancing mass $m_2$ lies at the centrum and hence at the axis of rotation of the crankshaft 1.

The three axes formed by the links 4 lie along a straight line 4a which is also the centerline of the links and, in the median position of the links 4 shown in FIG. 1 lies perpendicular to a line W passing through the center of mass of the mass $m_2$ and center of gravity of the working frame as seen in side view. The connecting rod 2 can extend along this line W.

The axis of the suspended mass of the drive is spaced by a distance $a_2$ from the pivot axis of pivot 7 and the pivot 12 by which the links 4 are connected to the working frame 5 are spaced by a distance $a_1$ from the pivot 7.

According to the invention, the product of the mass $m_2$ and the distance $a_2$ is substantially equal to the product of the mass $m_2$ and the distance $a_1$.

In the embodiment of FIG. 2 the eccentric shaft carries a roller 9 which bears upon a formation 10 projecting downwardly from the frame 5. A spring 11 maintains formation 10 against the eccentric surface 9. Here as well, the suspended mass $m_2$ is suspended from the distance $a_2$ from the pivot 7.

The other relationships set forth with respect to the mass and distance products above are applicable here. Instead of having the roller 9 on the eccentric shaft, the projection 10 on the frame may be provided with a cam roller which rides on the eccentric. The spring 11 must be dimensioned to be able to resist the greatest amount of energy which is transferred to the working frame.

In the embodiment of FIG. 3, the oscillating frame is provided with an offset leg $5a$ on which the links 4 are journaled and which permits the links to be vertical in their median position. In this embodiment as well, connecting rod 2 extends generally along the normal W to the centerline of the link 4. Here, however, the plane of the links 4 also lies normal to the line W which extends in the oscillation direction.

The eccentric mass is also journaled on an extension of the links 4 on this embodiment and the above-described relationships with respect to the masses is provided here as well.

We claim:

1. An oscillating machine, comprising:
   a base;
   a working frame of mass $m_1$ spaced from said base;
   a plurality of links pivotally connected to said working frame and to said base for supporting said working frame for oscillating movement relative to said base; and
   an oscillating drive coupled to said working frame, said oscillating drive including:
   an extension on member formed on one of said links and extending from a first pivot means, which connects said one of said links to said base, in a direction away from a second pivot connecting said one of said links to said working frame, said first and second pivots being spaced apart by a distance $a_1$,
   a motor-driven eccentric drive assembly of a suspended mass $m_2$ mounted on said extension and having an axis located at a distance $a_2$ from said first pivot such that the product $m_1 \cdot a_1$ is substantially equal to the product $m_2 \cdot a_2$, said axis being located substantially at an intersection between a centerline through said first and second pivots in a median position of the oscillation range of said one of said links and a line normal to said centerline through the center of mass of the working frame and
   coupling means operatively engaged with said motor-driven eccentric drive assembly so as to be displaced with the throw thereof and operatively connected to said working frame so as to actuate said working frame with said throw.

2. The oscillating machine defined in claim 1 wherein said motor-driven eccentric drive assembly includes a motor and a crankarm driven by said motor.

3. The oscillating machine defined in claim 2 wherein said coupling means includes a connecting rod extending from said crankarm generally along said line which is normal to said centerline and pivotally connected to said working frame so as to operate on the center of mass thereof.

4. The oscillating machine defined in claim 1 wherein said motor-driven eccentric drive assembly includes a motor having a driving shaft, said driving shaft carrying an eccentric member and driven by said motor.

5. The oscillating machine defined in claim 4 wherein said coupling means includes a formation on said working frame bearing upon said eccentric member of said motor-driven eccentric drive assembly along a line for action corresponding generally to said line which is normal to said centerline.

* * * * *